Figure 1:
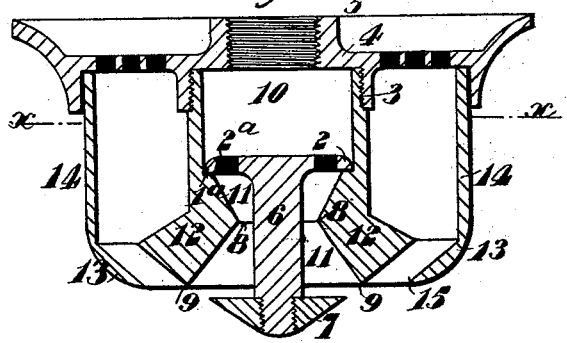

(No Model.) 2 Sheets—Sheet 1.

T. C. J. THOMAS.
GAS LAMP.

No. 495,280. Patented Apr. 11, 1893.

Witnesses

Inventor.
Thomas Cooper John Thomas (No Model.) 2 Sheets—Sheet 2.

T. C. J. THOMAS.
GAS LAMP.

No. 495,280. Patented Apr. 11, 1893.

Witnesses. Inventor.

UNITED STATES PATENT OFFICE.

THOMAS COOPER JOHN THOMAS, OF LONDON, ENGLAND.

GAS-LAMP.

SPECIFICATION forming part of Letters Patent No. 495,280, dated April 11, 1893.

Application filed February 18, 1891. Renewed November 15, 1892. Serial No. 452,048. (No model.) Patented in England February 27, 1890, No. 3,130; in France January 13, 1891, No. 210,741; in Belgium January 13, 1891, No. 93,424; in Sweden January 13, 1891, No. 3,871; in Norway January 13, 1891, No. 2,292; in Germany January 14, 1891, No. 59,273; in Italy March 31, 1891, No. 296, and in Austria-Hungary June 16, 1891, No. 2,713.

*To all whom it may concern:*

Be it known that I, THOMAS COOPER JOHN THOMAS, a subject of the Queen of Great Britain and Ireland, residing at Finsbury Park, London, in the county of Middlesex, England, have invented certain new and useful Improvements in Gas-Lamps, (for which I have obtained Letters Patent in Great Britain, dated February 27, 1890, No. 3,130; in France, dated January 13, 1891, No. 210,741; in Belgium, dated January 13, 1891, No. 93,424; in Italy, dated March 31, 1891, Reg. Att., Vol. LVII, No. 296; in Austria-Hungary, dated June 16, 1891, No. 2,713; in Germany, dated January 14, 1891, No. 59,273; in Sweden, dated January 13, 1891, No. 3,871, and in Norway, dated January 13, 1891, No. 2,292,) of which the following is a specification.

This invention has reference to improvements in regenerative lamps and relates to the burners and to a construction whereby the lamps are rendered practically wind proof so that the flame can burn steadily when the lamp is in the open air or in a large covered but otherwise open space such as a market or shed.

In a burner according to this invention the burner proper is surrounded by an air heater adapted to be connected to a gas supply pipe and this air heater is in the form of a pipe made contracted or of gradually decreasing diameter at the open end whence air issues, and with or without annular divisions as in lamps of the kind described in the specification of Patent No. 402,204, dated April 30, 1889. The burner proper comprises inlet and outlet tubes, that may in some cases be made as one tube, (hereinafter called the burner tube) and a perforated wall or diaphragm that may be flat or of other shape such as conical, and through which the gas issues into an annular space that is contracted in width at some part below the orifices of the wall or diaphragm, and which is formed by the burner tube and a stem within that tube, a button being provided to deflect the gas. The perforated diaphragm or end (hereinafter called the diaphragm) can be made in one with or secured to the burner tube, or be made separate therefrom, and allowed to rest upon a shoulder within the said tube which may be in one length or in two or more lengths connected together according to circumstances. The air heater may consist of one or more tubes surrounding the burner tube and having the lower end or ends contracted as in the construction of lamp described in my said former specification.

As will be obvious my improved burners can be variously modified in construction.

In the accompanying drawings:—Figures 1, 2, 3, 4 and 5 are vertical sections illustrating different constructions of burners according to this invention in each of which the burner proper is surrounded by and attached to an air heater. Fig. 6 is a horizontal section taken in the line $x\ x$ Fig. 1.

In the construction of burner shown in Figs. 1 and 6, 1 is a burner tube provided with a perforated transverse diaphragm 2 and secured in the socket 3 of a perforated plate 4 which forms the top of an air heater made with an internal screw threaded tubular part 5, whereby it can be secured to a gas supply pipe in a manner well understood. 6 is a downwardly extending central stem carried by the diaphragm 2 and provided at its lower end with a button 7 to deflect issuing gas in an outward direction. The burner tube 1 below the perforated diaphragm 2 is made of gradually decreasing diameter to the part 8 in its length from which it again gradually increases in diameter to the lower end 9. Thus the part of the burner tube above the perforated diaphragm forms a gas chamber 10 and the part below incloses around the button stem an annular space 11 into which the gas passes by the holes $2^a$ in the diaphragm and from which owing to its having to pass through a contracted passage at 8 it issues in a uniform annular stream. Also by the construction described any dust or free carbon in the gas entering the gas chamber 10 will pass with the gas through the perforations $2^a$, which can be made comparatively large say each of a diameter of about one-eighth of an inch, and will thus be prevented from interfering with the efficiency of the lamps by choking up the gas passage or passages. The lower end of the burner tube at its outer circumference is provided with an annular enlargement 12 the lower surface of which is of inverted truncated conical form as shown and which in conjunction with the contracted lower end 13 of the outer wall 14 of the air heater, forms a downwardly and inwardly inclined annular air passage 15 for directing heated air, passing through the heater upon the upper surface of the annular flame proceeding from the burner. The upper surface of the enlargement 12 may also be inclined as shown to direct the air to the passage 15 and prevent lodgment of dirt.

Figure 2:
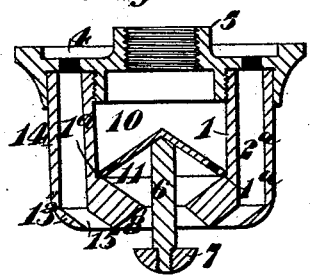

In Fig. 2 the perforated diaphragm 2 is made of conical form to further insure escape of dust and free carbon from the gas chamber 10, and the annular projection 12 shown in Fig. 1 is dispensed with, the lower outer surface of the burner tube 1 being made of inverted truncated conical shape to form the annular air passage 15 with the lower contracted end of the air heater. In other respects the construction is similar to that hereinbefore described with reference to Fig. 1. Instead of the burner tube 1 being made with an annular enlargement and having its interior doubly inclined below the perforated diaphragm as above mentioned, so that the cross sectional area of the annular space 11 gradually decreases and afterward gradually increases, the burner tube may be simply contracted at its lower end as shown in Fig. 3.

In Figs. 1 and 2 the perforated diaphragm simply rests upon a shoulder 1ª formed within the burner tube which is made in one piece. This construction readily admits of the diaphragm being raised by the stem and then allowed to fall on its seat and thereby produce sufficient shock or jar to dislodge carbon or other matter that might have adhered to the diaphragm or to the burner tube.

Figure 3:
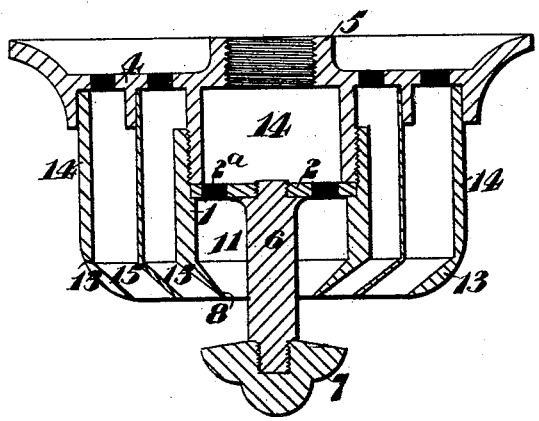

In Fig. 3 the burner tube is in two lengths secured together with the perforated diaphragm between them. The upper length is made in one with the perforated plate 4 of the air heater, though it may be attached to this plate as in Fig. 1 or Fig. 2, and the lower end of the lower length is contracted or made of gradually decreasing diameter in order to contract the gas passage for the purpose hereinbefore mentioned.

Figure 4:
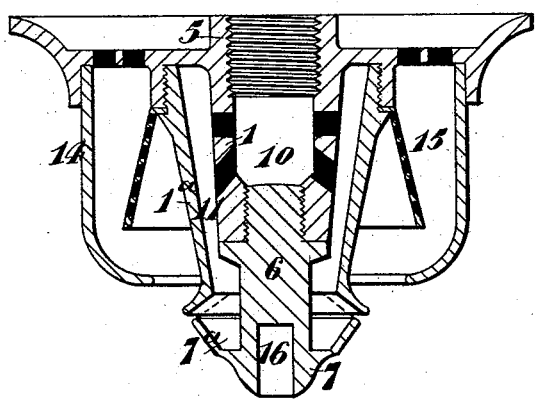

In the modified form of burner shown in Fig. 4 the perforated diaphragm is dispensed with; the burner proper is a perforated tube 1 whose lower end is closed by screwing into it a part of the button stem 6. This burner may be of inverted truncated conical form as shown or be of cylindrical form, and some or all of the gas holes 2ª in it may have a downward inclination to facilitate the escape of dirt. Around it there is a tube 1ª in the form of a hollow truncated cone that forms with the burner tube and stem a gas passage 11 of gradually decreasing cross sectional area from top to bottom. The lower end of the tube 1ª is splayed out or made with a widening mouth which in conjunction with the button 7 imparts a downward and outward direction to the issuing gas. The air heater can be provided with a perforated or reticulated wall or annular division 15 in the form of a truncated cone to break up and produce a uniform and steady flow of heated air through the air heater.

Figure 5:
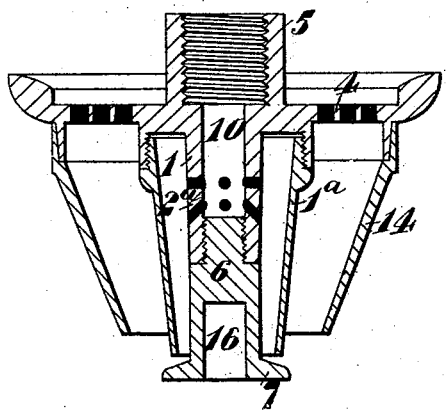
Figure 6:
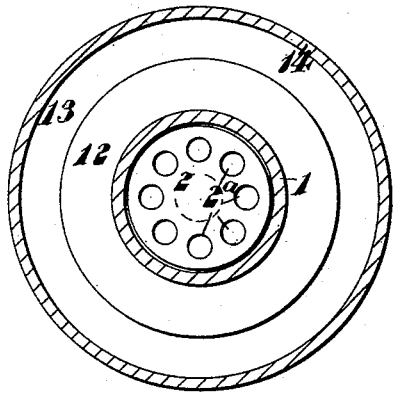

In Fig. 5 the perforated burner tube 1 is of cylindrical form and the truncated conical tube 1ª that surrounds it is not splayed out at its lower end as in Fig. 4, a downward and outward direction being imparted to the issuing gas by the conical upper surface of the button 7. The outer wall 14 of the air heater is made as an inverted truncated hollow cone that forms with the tube 1ª and air heating chamber of gradually decreasing cross sectional area from top to bottom whereby the downward current of air passing therethrough is caused to act in an efficient manner upon the top of the flame proceeding from the burner. The stems 6 shown in Figs. 4 and 5 are each formed with a square hole 16 to receive a key by which the stem can be readily unscrewed from the burner tube for cleaning purposes. The stem shown in Fig. 4 can be formed with a recess or pocket 7ª to receive dirt from the gas, or it may be made solid and have its upper side inclined downward and outward as indicated in dotted lines.

What I claim is—

1. In a regenerative gas lamp, the combination with an air heater, of an inverted burner suspended centrally within said air heater and comprising an inlet tube, an outlet tube, a perforated wall or diaphragm between said tubes, and a stem arranged centrally within said outlet tube and provided with a deflector below the lower end of said tube, said outlet tube having its inner surface inclined or tapered in the direction of its length, substantially as herein described for the purpose specified.

2. In a regenerative gas lamp, the combination of an air heater comprising a perforated plate having at its upper side a tubular extension for attachment to a gas supply pipe, and at its under side an air tube of inverted hollow truncated form, and an inverted burner suspended centrally within said air heater and comprising an inlet tube, an outlet tube, a perforated diaphragm between said inlet and outlet tubes, and a stem arranged centrally within said outlet tube and forming therewith an annular gas passage, and a deflector carried by said stem and located below the lower end of said outlet tube, said outlet tube having its inner surface inclined or tapered below said perforated diaphragm substantially as herein described.

3. In a regenerative gas lamp, an inverted burner comprising an inlet tube forming a gas box, an outlet tube arranged coaxial with said inlet tube and having an inner inclined or tapered surface, a perforated diaphragm between said tubes, a stem extending vertically from said diaphragm and arranged centrally within said outlet tube and a button carried by said stem, substantially as herein described.

4. In a regenerative gas lamp a combined air heater and inverted burner comprising a perforated plate 4 with screw threaded tubular part 5 at its upper side and a hollow inverted truncated tubular part 14 at its under side, an inlet pipe 1 carried by said perforated plate and formed with gas exit apertures $2^a$, a stem 6 screwed into the lower end of said pipe 1 and provided with a deflecting button 7, and a tube $1^a$ of inverted truncated conical form surrounding said burner and stem substantially as herein described.

In testimony whereof I have signed my name to this specification in the presence of two subscribing witnesses.

THOMAS COOPER JOHN THOMAS.

Witnesses:
WM. THOS. MARSHALL,
PERCY. E. MATTOCKS,
*Both of 2 Pope's Head Alley, Cornhill, London, Gentn.*